Fig. 1.

Aug. 29, 1967  A. PACCIARINI ET AL  3,337,918
APPARATUS TO PRINT AN EMBOSSED PATTERN
ALONG THE PERIPHERAL BAND OF
A TOROIDAL ARTICLE
Filed March 3, 1965  11 Sheets-Sheet 3

*Fig. 3.*

INVENTORS
Antonio Pacciarini
& Dario Giletta

BY Stevens, Davis, Miller & Mosher
ATTORNEYS

Fig. 7.

INVENTORS
Antonio Pacciarini
& Dario Giletta

BY Stevens, Davis, Miller & Mosher
ATTORNEYS

Fig. 9

INVENTORS
Antonio Pacciarini
Dario Giletta

United States Patent Office 3,337,918
Patented Aug. 29, 1967

3,337,918
APPARATUS TO PRINT AN EMBOSSED PATTERN ALONG THE PERIPHERAL BAND OF A TOROIDAL ARTICLE
Antonio Pacciarini and Dario Giletta, Milan, Italy, assignors to Pirelli S.p.A., Milan, Italy
Filed Mar. 3, 1965, Ser. No. 438,825
Claims priority, application Italy, July 7, 1961, 12,473/61, Patent 658,679; Feb. 10, 1962, 2,639/62, Patent 665,377
19 Claims. (Cl. 18—17)

ABSTRACT OF THE DISCLOSURE

Apparatus for imprinting a predetermined embossed pattern upon the peripheral band of a toroidal article while the band is in a plastic state, including a mold having two coaxial continuous annular sections and a third section disposed between the annular sections. The third section includes a plurality of sectors, each of which has on its inner surface a plurality of radial projections adapted to engage the peripheral band. Means are also provided to axially displace the annular sections relative to each other along with means to displace the sectors in a radially inward direction towards the article after it has been enclosed between the annular sections.

This is a continuation-in-part of an earlier application of the applicants, Ser. No. 342,865 filed Feb. 4, 1964, which, in turn, is a continuation-in-part of applicants' application Ser. No. 206,088 and Ser. No. 206,089, each filed June 28, 1962, all three of which are now abandoned.

The present invention relates to an apparatus provided with a sectional mold, one mold section having sectors movable in a radial direction to print an embossed pattern along the peripheral band, in the plastic state, of a toroidal article and in particular on the tread band of a pneumatic tire provided with a ring-shaped reinforcing structure placed between the carcass and the tread, the function of the structure being to stiffen the tread band both in longitudinal and transverse direction. The ring-shaped reinforcing structure has a width substantially equal to that of the tread band and must possess a high resistance to tension, in order to withstand the longitudinal stresses due to the inflation pressure, together with a highly reduced or substantially negligible extensibility. Also the structure must be completely symmetrical relative to the beads of the tire due to the fact that in actual use on a vehicle the tire tends to displace the wheel upon which it is mounted in a direction normal to the direction of rotation with a force that is considerable even for a few millimeters of asymmetry of the reinforcing structures.

In order to obtain a pneumatic tire provided with a ring-shaped reinforcing structure having the above described features, great accuracy is required in all the operations for the construction of the tire and in particular during the molding and the vulcanization by means of which the various elements of the tire are settled and assembled in final form. In the past, the molding and vulcanization of such tires were carried out, in conventional vulcanizing units, within two half-molds mating with each other along a plane passing through the mid-circumferential line of the tire, the inner peripheral surfaces of said half-molds being provided with blocks and with undulated laminae radially projecting and corresponding to the cavities to be formed in the tread band. However, the tire, to be introduced into the mold, had to have an outer diameter less than the diameter corresponding to said inner projections and therefore it was necessary to increase the diameter thereafter so that the projections would penetrate the tread band being embossed.

In the same arrangement, the tire was at first introduced into the lower half-mold, still hot due to the treatment of the previously cured tire, and its sidewall, upon coming in contact with said half-mold, assumed the shape of the profile of the latter by reason of the tire's own weight and temperature of the mold, whereas one-half of the tread band penetrated partially between the projections existing inside the peripheral band. Then, the upper half-mold was brought into contact with the lower half-mold and then compressed fluid was injected into the tire, either directly in contact with its inner surface, or into a curing bag previously provided in the tire itself.

In the above arrangement, it often happened that the upper half-mold, during its lowering, exerted a prejudicial tangential action on the free half of the tread band and that the subsequent injection of compressed fluid did not result in a symmetrical settling of the tire with respect to its mid-circumferential plane, since the lower half of the tire was not free to move like the upper one, it being already partially connected with the tread in the projections of the lower half-mold. Moreover, the fact that the tire had to be increased in diameter so that its peripheral band could penetrate completely between the projections, involved an elongation and/or an angular displacement of the reinforcing cords of the ring-shaped reinforcing structure which is incompatible with the desired inextensibility or very reduced extensibility of the same.

All the above cited factors had a negative influence on the regularity of the tire, causing irregular yieldings and truing up defects in both the reinforcing structure and in the tread.

In an attempt to eliminate the above described problems, it was proposed to use a mold having an upper section and a lower section in the form of a continuous ring, and a series of sectors corresponding to the desired tread band. However, the centripetal displacement of the sectors took place immediately after the tire was introduced into the lower half-mold due to the movement of the upper section toward the lower section. While this avoided the problems of the former method described above with respect to elongation or angular displacements of the cords of the reinforcing structure, because it was no longer necessary to increase the diameter of the tire, the problem of faulty settling of the tire in the mold was not thereby solved.

An object of the present invention is an apparatus comprising a mold constituted by two continuous annular sections between which there is interposed, a third annular section formed by at least two sectors each provided on its inner surface with radial projections corresponding to the recesses which are to be embossed on the peripheral band of the article, together with novel means for simultaneously displacing or moving said sectors in radial directions.

These and further features of the invention will appear more clearly from the following description, made with reference to the attached drawings, in which.

The curing unit represented in FIGS. 1, 2, 3 and 4 comprises a frame 1 bearing a cylindrical container 2 whose bottom is provided with a central hole 2a passed through downwardly by a single-acting cylinder 3, provided with an opening 4 for the injection and the discharge of a compressed fluid. Inside the cylinder 3 there is slidably mounted a piston 5 whose stem 6, in correspondence of its upper end, supports a circular plate 7 onto which there are assembled the lower section 8 and the central section 9 of a mold. The lower section 8 has an annular continuous shape, whereas the central section is subdivided into a plurality of sectors, provided on their inner surface with projections corresponding to the cavities or recesses which are to be obtained on the tread band to be embossed. The sectors 9 are assembled on supports 10, each sector being provided with two lateral guides 11 and with an inclined plane 12 in the form of a plate mounted between the guides 11.

In contact with the plate 12 and inserted between each pair of guides 11, there is a second inclined plane 13, in the form of a plate integral with the frame 1 by means of the supporting ring 14. The upper section 15 of the mold has an annular continuous shape and is supported by the plate 16 assembled inside the cover 17 of the container 2. The cover 17 is secured to the lower part of a transverse beam 18 provided at both ends with a pivot 19 supported in the upper end of a lever 20, which is pivoted at the opposite end into a pivot 21 fixed on and carried by a sprocket wheel 22 assembled upon the supports 23 and 24 of the frame 1.

At both sides of the curing unit there is a plate 25, integral with the frame 1 and provided with a vertical guide 26 and with an inclined guide 27, along which can slide a roller 28 rotatably assembled on the pivot 19.

The plates 25 are each provided with a second vertical guide slot 29 into which can slide a second roller 30 fixed on and carried by vertical arms 29' mounted on and depending from opposite sides of beam 18.

The sprocket wheel 22 is actuated in both directions through the gear 31 which meshes with the pinion 32 keyed on the shaft 33; on the midline of the latter there is assembled the gear 34, actuated by the reversing motor 35 through the endless screw 36.

In order to mold the tread band of a tire 37, at least partially shaped, into which the curing bag 38 has already been introduced, compressed fluid is at first injected through the opening 4 of the cylinder 3 to raise the piston 5 as far as the upper end of said cylinder and to lift at the same time the plate 7 supporting the lower section 8 and the central section 9 of the mold, so that the sectors 9 may be radially removed from the lower section 8 of the mold. Then the tire 37 is disposed on the lower section 8 of the mold and the sprocket wheels 22, through the endless screw 36 and the gears 34, 32 and 31, are actuated by the motor 35 in order to bring the pivots 21 from the upper position they have in FIGURE 2 to the nearest position shown in FIGURE 1 to the base of the frame 1.

Figure 1:
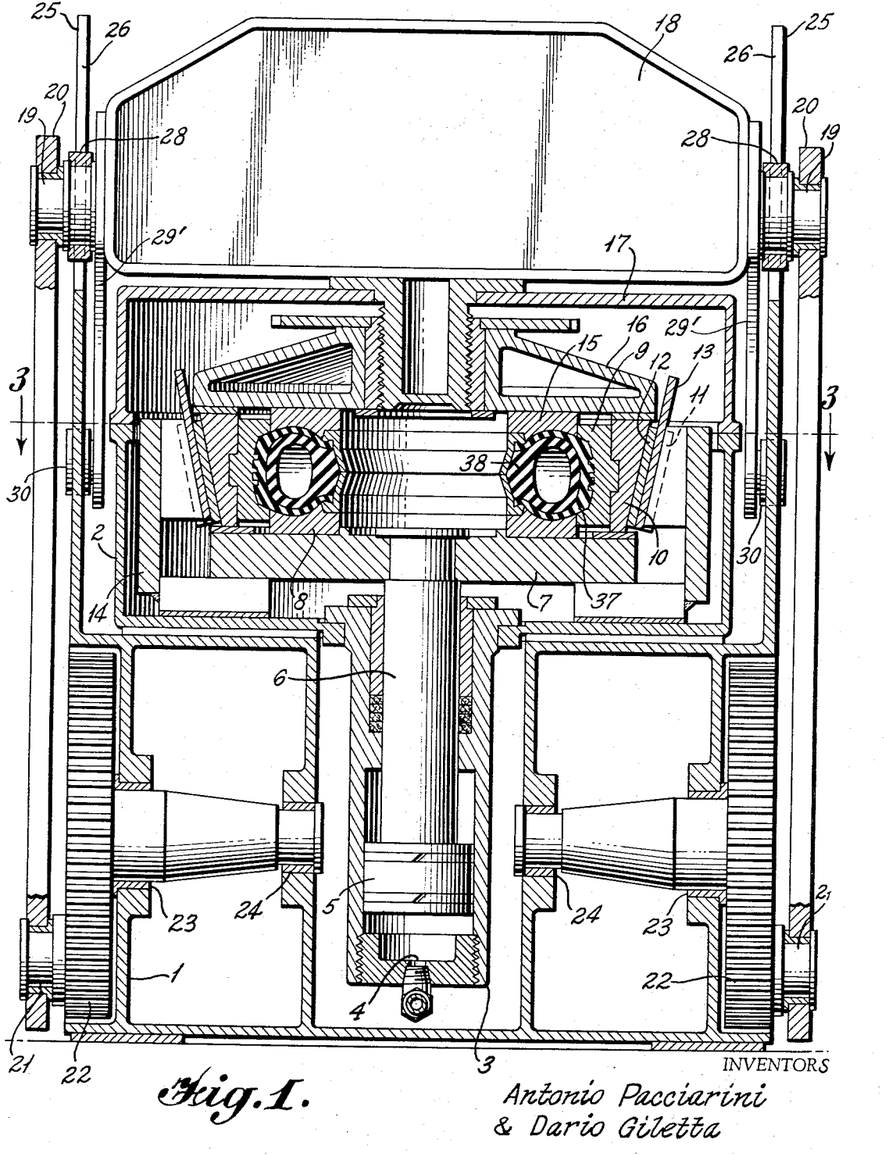
FIG. 1 is a vertical section of a curing unit for pneumatic tires into which a curing bag has been previously introduced separately.
Figure 2:
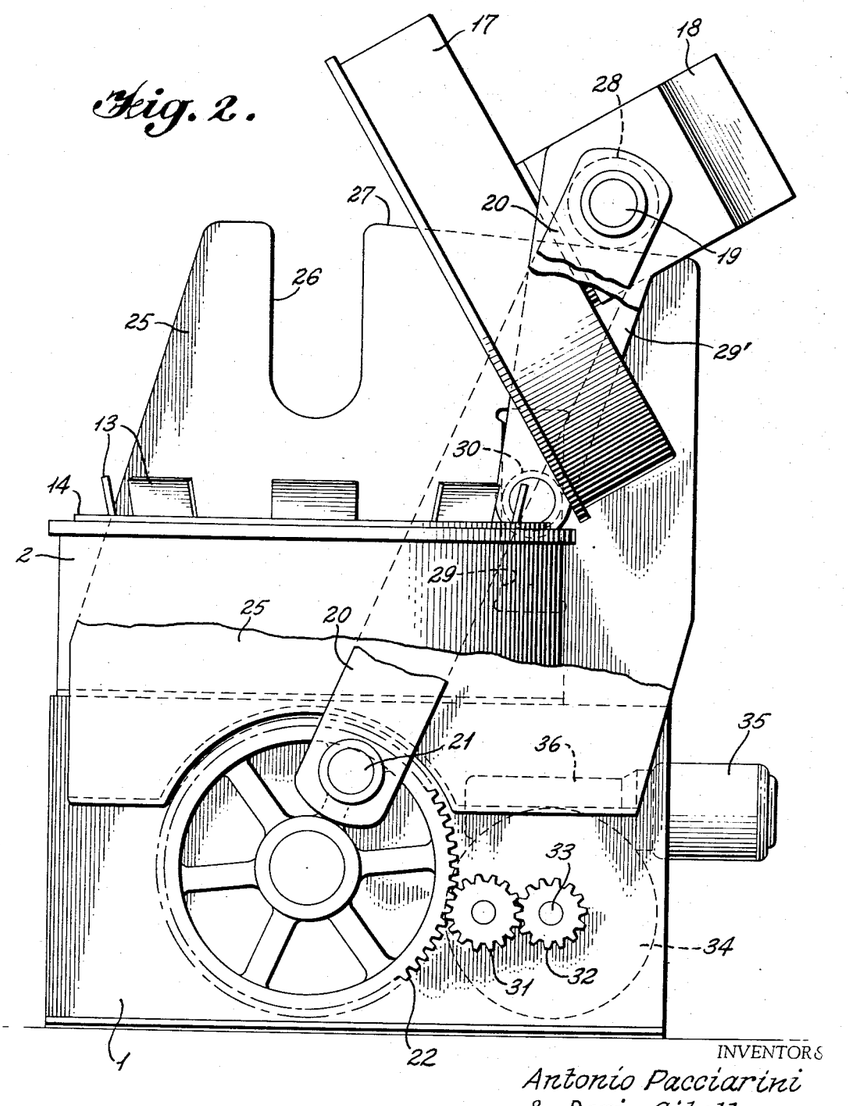
FIG. 2 is a side elevational view of the unit shown in FIG. 1, with portions thereof broken away for illustration purposes.
Figure 3:
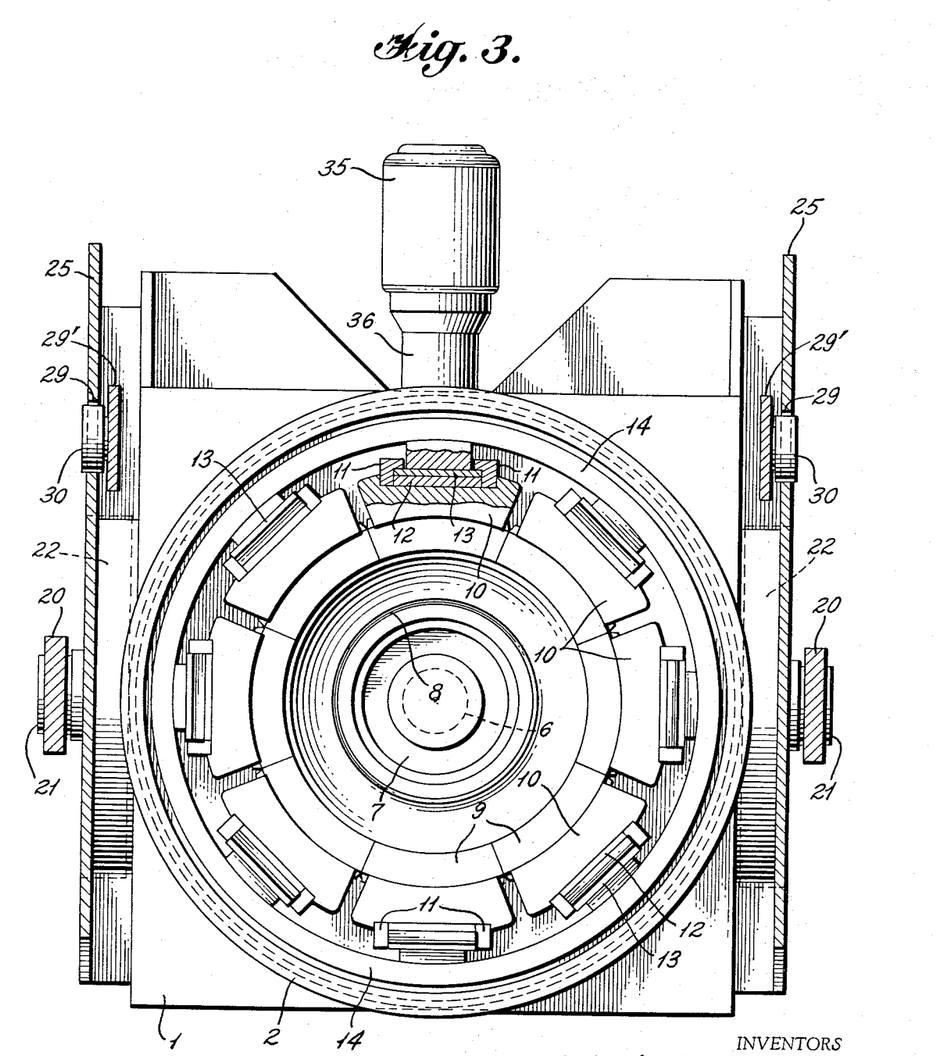
FIG. 3 is a horizontal section on line 3—3 of FIG. 1.
Figure 4:
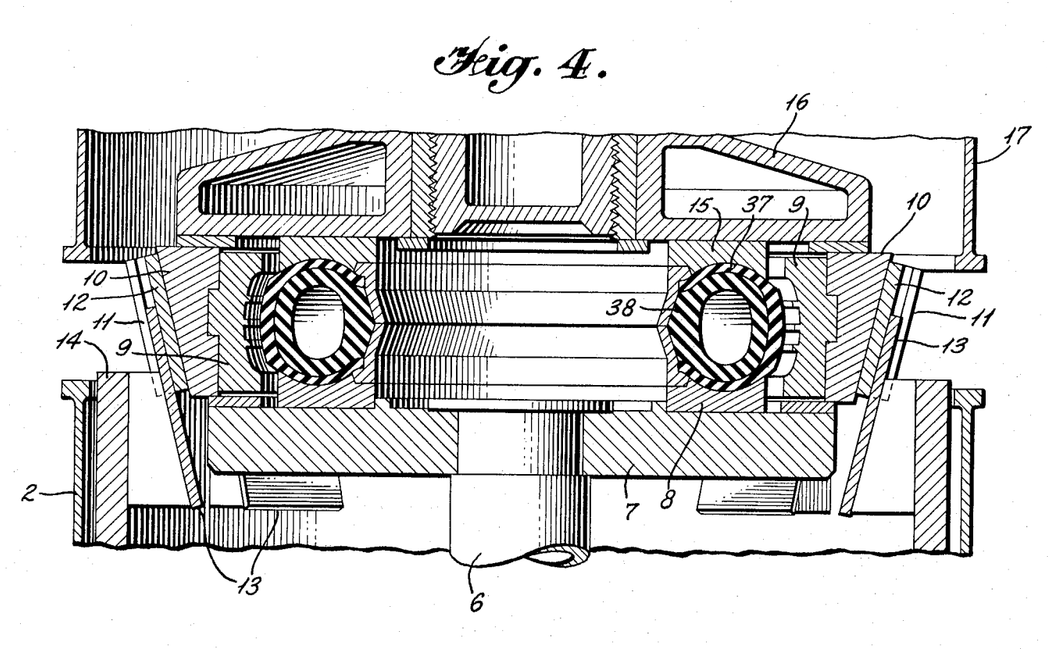
FIG. 4 is a fragmentary detailed section of the curing unit as in FIG. 1, on an enlarged scale, and with the central mold section in open position.

As a result of the rotation of the wheels 22, the crank mechanism, constituted by the levers 20 and by the beam 18, rotates the cover 17 about the pivots 19 until the assemblage reaches a horizontal position, and this movement is controlled by means of the rollers 28 which ascend by rolling along the guides 27. The cover 17, still in consequence of the rotation of the wheels 22, is therefore lowered, remaining always parallel to itself. This vertical movement is controlled by means of the rollers 28, which are now descending into the vertical guides 26, and by means of the rollers 30 which are also descending into the vertical guides 29. The upper section 15 of the mold, during its downward movement together with the cover 17, engages on the upper bead of the tire and pushes it downwardly to a position in contact with the lower section 8 of the mold. At this moment compressed fluid is injected into the curing bag. The plate 16, continuing to move downwardly, pushes in the same direction the plate 7 and the elements supported by it, with a pressure which is higher than the pressure of the fluid existing below the piston 5, whereby the fluid is caused to return to the feeding source through the opening 4 of the cylinder 3. The lowering of the plate 7 actuates the sliding of the inclined plates 12 along the stationary inclined plates 13 and the consequent radial displacement of the sectors 9 which, by means of the projections provided on their inner surface, penetrate the tread band. At this moment the cover 17 comes into contact with the upper edge of the circular wall of the container 2, isolating the mold from the outer room, and therefore the curing of the tire can be carried out in the conventional way by injecting additional compressed fluid in the curing bag 38 in order to increase the pressure in its inside and by injecting compressed steam inside the container 2.

To remove the cured tire from the mold, after the release of the steam from the container 2 and of the compressed fluid from the bag 38, the above described movements are carried out by following an inverted sequence.

Figure 5:
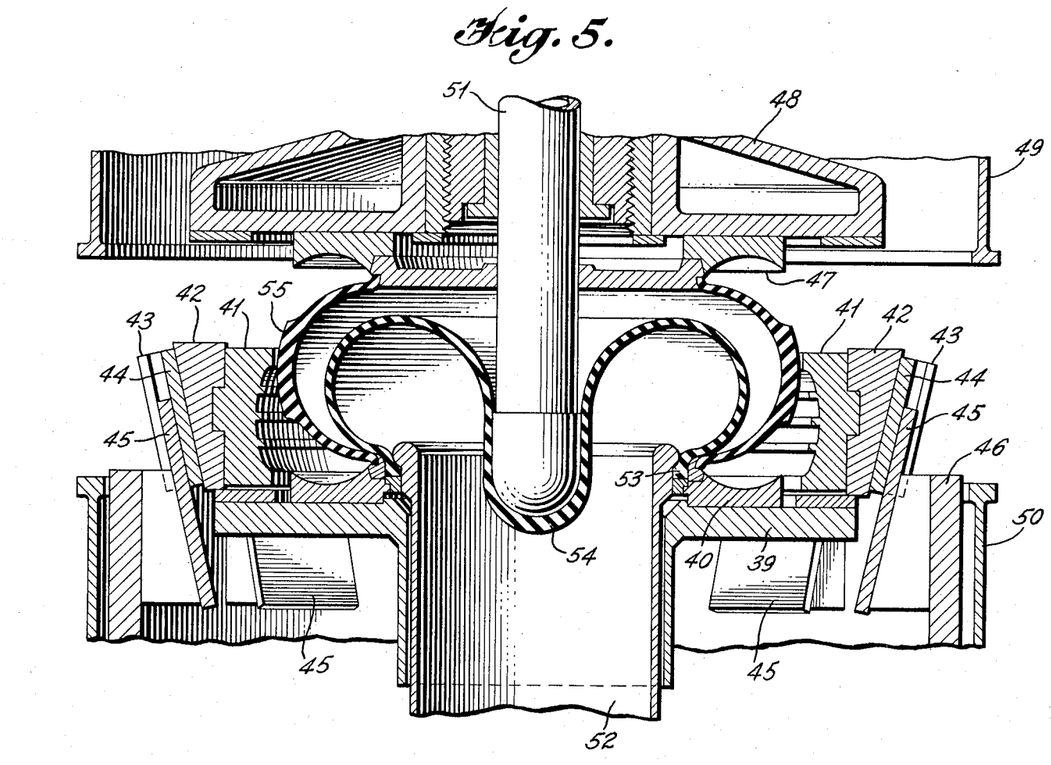
FIG. 5 is a fragmentary detailed section of a curing unit having a curing bag and provided with another form of the apparatus of the present invention.

In the embodiment illustrated by FIGURE 5, the lower section 40 and the central section 41 of a mold are assembled on a circular plate 39. The lower section 40 has an annular continuous shape, whereas the central section 41 is subdivided into a plurality of sectors each provided on its inner surface with projections corresponding to the cavities or recesses to be obtained on the tread band to be molded. The sectors 41 are assembled on supports 42, each provided with lateral guides 43 and having an inclined plane or plate 44 disposed between guides 43. In contact with the inclined plane 44 and inserted between each pair of guides 43, there is a second inclined plane or plate 45, integral with the frame base of the curing unit through the supporting ring 46. The upper section 47 of the mold is supported by the plate 48 assembled inside the cover 49 of the container 50. In the central part of the plate 48 there is a slidably mounted stem 51, whose lower end has a semispherical shape. The stem 51 is actuated by a piston not shown in the figure.

In the central part of the circular plate 39 there is assembled a cylinder 52 extending downwardly, which is provided on its bottom with an opening for the injection of the curing fluid. Between the lower section of the mold and the cylinder 52 there are clamped the thickened edges 53 of a flexible curing bag 54. The plate 39 and the elements supported by it can be pushed upwardly by a piston also not shown in the figure.

In order to emboss the tread band of a tire 55 at least already partially shaped, the plate 39 is at first raised to bring it to the position represented in the figure in order that the sectors 41 may be removed from the lower section 40 of the mold. Then the tire 55 is disposed on the lower section 40 of the mold and the plate 48 and the cover 49 are rotated and lowered, as described in connection with the embodiment illustrated in FIGS. 1–4. Then the stem 51 is pushed downwardly and, when the upper section 47 of the mold, during its lowering, engages with the upper bead of the tire, compressed fluid is injected through the opening provided on the bottom of the cylinder 52; in this way the compressed fluid pushes upwardly the curing bag 54 contained in the cylinder 52 and causes the central part of said curing bag to engage with the lower end of the stem 51. While the upper section 47 of the mold approaches to the lower section 40, the stem 51 is progressively withdrawn towards the top so that the curing bag 54 may gradually mate with the inner surface of the tire 55 starting from its clamped edge. When the lower surface of the plate 48 comes into contact with the upper surface of the sectors 41 and of their supports 42, the beads of the tire are at a definitive mutual distance and the tire is in contact with the inner surface of the sections 40 and 47 of the mold.

The plate 48, in its further downward movement, pushes downwardly the plate 39 and the elements supported by it with a pressure higher than the pressure exerted by the fluids existing below the piston, which had raised the plate, so that said fluid is forced to return to its feeding pipe. The lowering of the plate 39 causes the sliding of the inclined planes or plates 44 along the stationary inclined planes or plates 45, thus actuating the radial approaching of the sectors 41, which cause their projections to penetrate the surface of the tread band and close the mold completely. At this moment also the cover 49 comes in contact with the upper edge of the container 50, isolating the mold from the outer room. Then the curing of the tire is carried out in the conventional way by injecting additional compressed fluid in the curing bag 54 in order to increase the pressure in its inside, and by injecting compressed steam inside the container 50.

After curing, the tire is removed from the mold by repeating the above described operations with an inverted sequence, and the curing bag 54 is removed from the inside of the tire 55 by pushing it inside the cylinder 52 by means of the stem 51.

Figure 6:
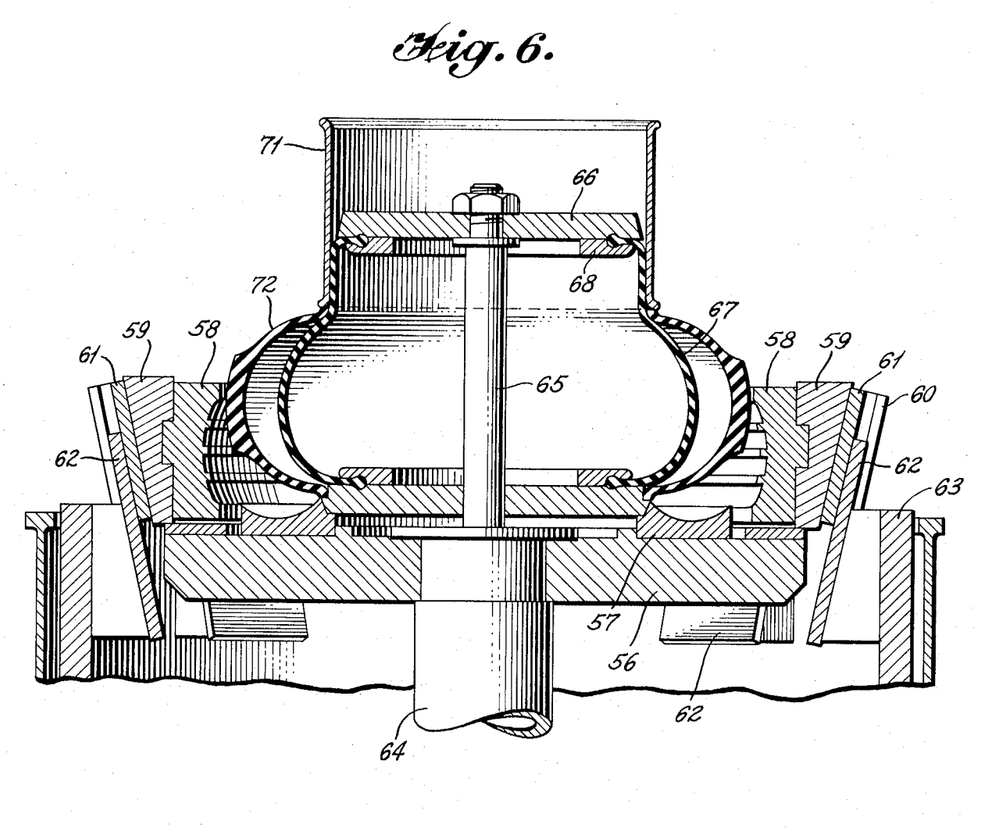
FIG. 6 is a fragmentary section like FIG. 5, but still another embodiment of the apparatus of the present invention.

In the embodiment depicted by FIGURE 6, the lower section 57 and the central section 58 of a mold are assembled on a circular plate 56. The lower section 57 has an annular continuous shape, whereas the section 58 is constituted of a plurality of sectors each provided with radial projections on its inner surface. The sectors 58 are assembled on supports 59, each provided with lateral guides 60 and having an inclined plane or plate 61 comprised between said guides 60. In contact with the inclined plane 61 and inserted between each pair of guides 60, there is a second inclined plane or plate 62, integral with the frame base of the curing unit through the supporting ring 63. The plate 56 is assembled on the upper end of a hollow stem 64 passed through by a second slidably mounted stem 65 carrying on its upper end a disc 66. A curing bag 67 is clamped at its thickened upper edges between the disc 66 and a ring 68 and at its lower edges between a plate 69, fixed on and carried by a plate 56, and a disc 70.

FIGURE 6 shows, moreover, a cylindrical container 71 which is in the indicated position only during the insertion of the curing bag 67 into the tire 72.

In order to emboss the tread band of a tire 72 at least partially shaped, the plate 56 is brought to its upper position, shown in FIGURE 6, so that the central sectors 58 of the mold assume positions spaced from the lower section 57, and the disc 66 is pushed upwardly until the curing bag 67 takes a cylindrical shape. Then the tire 72 is telescopically threaded about the curing bag 67 and its lower bead engages with the lower section 57 of the mold. Subsequently the cylindrical container 71 is also telescopically threaded about the bag 67 and is pushed downwardly until its lower edge engages with the upper bead of the tire. Then the disc 66 is progressively lowered and at the same time, through an opening, not indicated in the figure, compressed fluid is injected inside the bag 67 which, sliding along the inner surface of the container 71, gradually penetrates inside the tire 72 and mates with its inner surface. When the bag 67 has completely penetrated inside the tire 72, the container 71 is removed and the cover of the curing unit is rotated and lowered, as already described in respect of the curing unit represented in FIGS. 1–4.

While the cover of the curing unit moves toward the closed position, the upper half mold, which is fast with it, engages with the upper bead of the tire and pushes it downwardly until it has reached the definitive distance from the other bead. At this moment additional compressed fluid is injected inside the curing bag 67 to oppose to the pressure which is exerted immediately afterwards on the tread band by the sectors 58 in consequence of the sliding of the inclined planes or plates 61 along the inclined planes or plates 62 by virtue of the lowering of the plate 56, pushed downwardly by the upper portion of the curing unit.

When the mold is completely closed, additional compressed fluid is injected in the curing bag 67 to increase the pressure inside it and the curing operation is carried out as described above.

For the removal of the cured tire from the mold, the above indicated operations are repeated in an inverted sequence; in this second phase, however, the presence of the container 71 is not necessary.

It is understood that the details of the apparatus which control the radial displacement of the central sectors of the mold can be varied without departing from the spirit and the scope of the present invention. Likewise, it is not indispensable to provide an inflatable core inside the article to be molded because, while in the case of normal tires this core is preferred, in the case of tubeless tires, which are practically impermeable, said core is not required. Also in the case of articles of another kind, the use of a solid or rigid core can prove more advantageous.

In addition, the curing operation may involve only the surface on which the embossed pattern is to be molded, as for instance in the retreading of worn out tires with a new tread band.

The apparatus of the present invention has remarkable advantages in respect to those heretofore practiced. In fact, enclosing the article for the first time between two parallel sections of the mold, which do not impinge upon the peripheral band to be molded, this band remains perfectly trued up, as it is relatively completely free up to the position of the complete closure of the mold which is carried out by radial compression, so that any tangential stress on said band is completely avoided. When compressed fluid is injected into the tire, it is free to symmetrically settle with respect to its mid-circumferential plane. Moreover, the fact that it is no longer necessary to increase the outer diameter of the tire, prevents any irregular yielding due to the elongation of the cords and permits in the case of tires provided with ring-shaped reinforcing structures, said structures to be built with a diameter practically equal to the final one.

Figure 7:
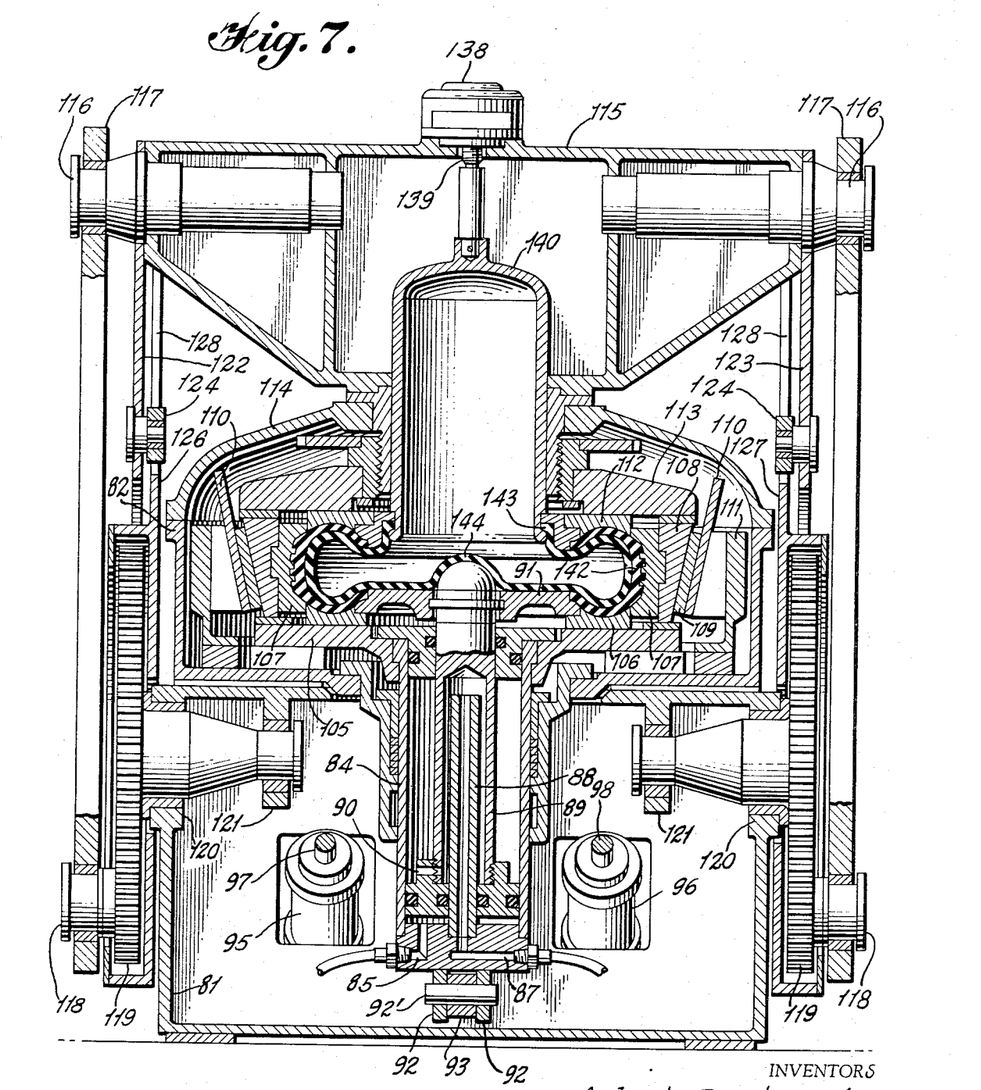
FIG. 7 is a transverse vertical section, with parts shown in elevation, of a vulcanizing or curing unit for pneumatic tires provided with an incorporated curing bag.
Figure 8:
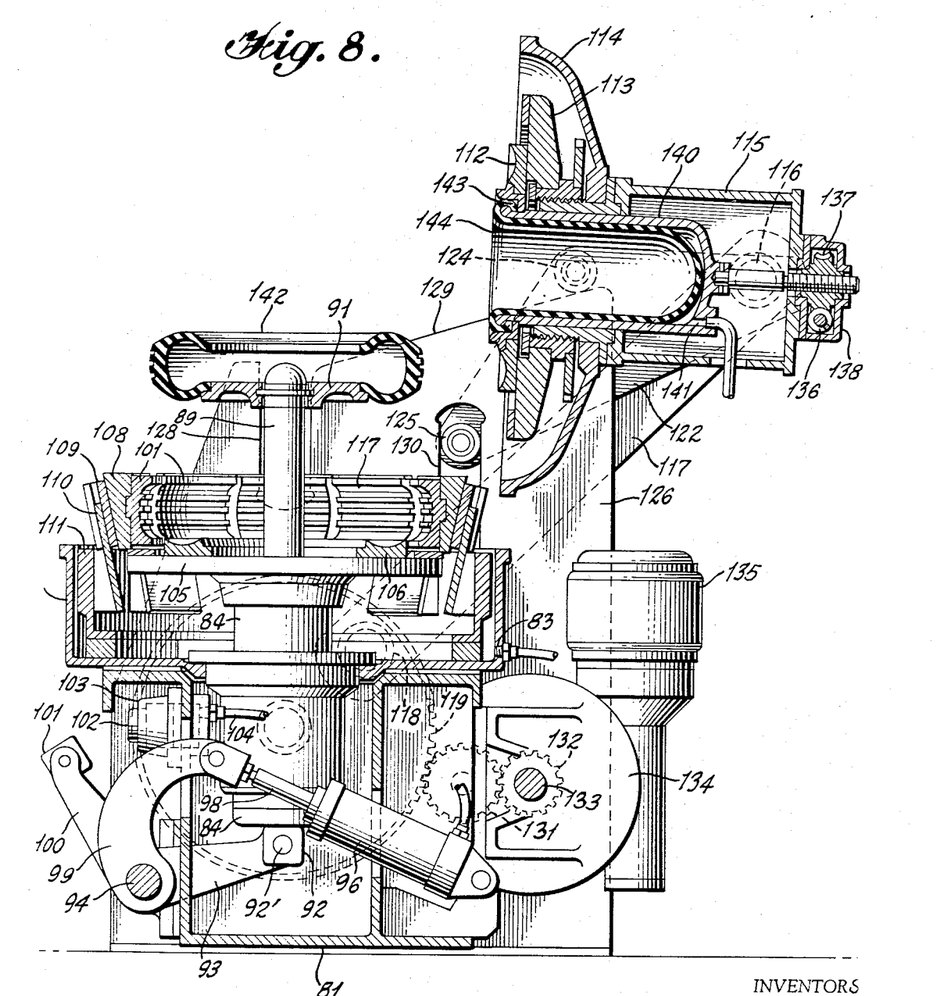
FIG. 8 is a side elevational view of the apparatus of FIG. 7, in its open position, and with some parts being shown in section.

The form of apparatus as shown in FIGS. 7 and 8 and its use was evolved and produced because of certain difficulties that occurred in the utilization of the form of apparatus as shown by FIG. 5. These difficulties occurred in printing a pattern on the tread band of relatively large pneumatic tires having been of the type heretofore described. Such difficulties were found virtually nonexistent in smaller tires. However, with larger tires of increased weight it was found:

(a) Virtually impossible to include in the apparatus means for automatically detaching the treated tire from the lower section of the mold due to the presence of the cylindrical housing for the curing bag in the central lower part of the device and of the stem for operating the caring bag in the central upper part of the same, this deficiency being particularly notable when the tires were subjected to the heat treatment when they tended to adhere to the mold as a result.

(b) Very difficult with a flexible curing bag of a cylindrical shape to insert the curing bag in the hollow toroidal article in such a way that it may uniformly mate with the inner surface of the same, due to the cylindrical shape of the curing bag because folds take place, therefore an evenly distributed pressure is not exerted on the inner surface of the toroidal body and localized protuberances often are caused in the article. If the article, as in the case of a pneumatic tire, is subjected to a subsequent heat treatment and the curing bag is made of rubber, both the protuberances of the article and the folds of the curing bag become permanent and the tire must be rejected as unserviceable.

(c) The disposition of the housing for the curing bag in the lower part of the apparatus caused difficulties. In fact, when the curing bag was returned to its housing after the treatment of the article, it would again take the shape of a cylinder open at the top so that the condensate formed on the face of the curing bag opposite to that which contacts the compressed fluid collects on the bottom of the cylindrical curing bag, and when the latter is again inserted into another tire to be treated, the condensate penetrates between the inner surface of hte article and the curing bag and gives rise to considerable difficulties.

Therefore a further object of the present invention is an apparatus for printing an embossed pattern along the peripheral band, in the plastic state, of a hollow toroidal article and in this case, for heat treating said article, substantially comprising a mold constituted by two annular continuous sections between which there is interposed a third annular section composed by at least two sectors provided on their inner surface with radial projections corresponding to the recesses which it is wished to obtain on the peripheral band of the article, means for reciprocally approaching and removing said continuous annular sections and means for simultaneously displacing said sectors in a radial direction, a flexible curing bag disposed into a cylindrical housing and having a thickened edge clamped between one of the continuous annular sections of the mold and the edge of the cylindrical housing, means for injecting and then discharging a compressed fluid between the inner surface of said housing and the flexible curing bag in order to push the latter inside the hollow toroidal article, and means for causing a positive difference of pressure between the outer surface and the inner surface of said bag when the latter is disposed inside the hollow toroidal article and the compressed fluid has been already discharged at least partially from the same.

The flexible curing bag has preferably a toroidal shape, corresponding to the final inner profile of the hollow toroidal article to be treated.

If the article must be subjected to a heat treatment, the apparatus comprises moreover a fluid-tight container enclosing the mold and means for injecting heated and compressed fluid inside said container and for adjusting the pressure of said fluid.

The apparatus of the present invention can be moreover provided with means able to detach and remove the hollow toroidal article from one of the continuous sections of the mold.

The vulcanizing or curing unit represented in the above indicated figures is constituted by a frame 81 onto which is assembled a cylindrical container 82 provided on its back with an opening 83 for the injection and the release of the compressed vulcanizing fluid, and on its bottom with a central hole, passed through downwardly by a double-acting cylinder 84 provided with an opening 85 for the injection and the release of the compressed fluid below the piston 86 and with an opening 87 connected to a tube 88. The tube is integral with the cylinder 84 and is disposed inside the hollow stem 89, which is provided in its lower portion with an opening 90 for the injection and the release of compressed fluid from the chamber of annular section disposed over the piston 86.

The stem 89, in correspondence to its upper end, supports a circular plate 91 whose edge is so shaped as to receive the bead of a pneumatic tire. On the bottom of the cylinder 84 there are slidably mounted two sliding blocks 92 passed through by a pivot 92′ onto which is pivoted the end of a lever 93. The opposite end of said lever is keyed on a shaft 94 rotatably assembled in the frame 1. At the two sides of the lever 93, in a position symmetrical to it, two cylinders 95 and 96 are assembled on the frame 81. Into said cylinders slide two pistons, whose stems 97 and 98 are each pivoted at one end of the corresponding levers 99, whereas the oppposite ends of levers 99 are keyed on the shaft 94. In the central part of said shaft there is keyed a lever 100, whose other end, shaped as a fork, is engaged into a block 101 which, when the vulcanizing unit is closed, is in contact with the stem 102, connected to the piston slidable into the single-acting cylinder 103 provided with an opening 104 for the injection and the release of a compressed fluid. Fixed on the upper end of the cylinder 84, there is assembled an annular plate 105 onto which lie the lower section 106 and the intermediate section 107 of a mold. The lower section 106 has a continuous annular shape, whereas the intermediate section 107 is divided into a plurality of sectors, provided on their respective inner surfaces with projections corresponding to the recesses which are to be obtained on the band to be molded. The sectors 107 are assembled on supports 108, each provided with two lateral guides, and having an inclined plane or plate 109 disposed between said guides. A second inclined plane or plate 110, integral with the frame 81 by means of the supporting ring 111 and disposed between each pair of said guides, is provided in contact with the plate 109. The upper section 112 of the mold has a continuous annular shape and is supported by the plate 113 assembled inside the cover 114 of the container 82. The cover 114 is secured to the lower part of a transverse beam 115 provided at both ends with a pivot 116, supported at the upper end of a lever 117 pivoted at the opposite end in a pivot 118 secured on a sprocket wheel 119 assembled in the supports 120 and 121 of the frame 81. At the two sides of the beam 115 there are fastened the plates 122 and 123, wherein the opposed pairs of rollers 124 and 125 are slidably mounted. At the two sides of the frame 81 there are assembled, integral with it, the two plates 126 and 127 each provided with a vertical guide 128 and with an inclined guide 129 along which can slide the rollers 124, and with a further vertical guide 130 along which can slide the rollers 125.

The pair of sprocket wheels 119 are actuated in both directions through the gears 131, which mesh with the pinions 132, keyed on the shaft 133 of the reduction gear 134, by means of the reversible motor 135.

The top of the beam 115 carries an endless screw 116 which meshes with a helical gear 137, assembled in a housing 138 and provided with an axial threaded hole into which is engaged a screw 139. At the lower end of said screw 139 is secured a cylinder 140 opening downwardly and provided at the opposite side with a hole 141 for the injection and the release of the compressed fluid used for molding and vulcanizing the pneumatic tire 142 enclosed in the mold and for eliminating the condensate formed within the cylinder 140. Between the lower edge of this cylinder and the upper section 112 of the mold there is clamped the thickened edge 143 of a curing bag 144 of toroidal shape, corresponding to the shape of the tire which it is wished to obtain. The curing bag 144 is encased in the cylinder 140 when the vulcanizing unit is not operative.

In order to mold and vulcanize a pneumatic tire 142, at least partially shaped, the vulcanizing unit being closed as shown in FIG. 7, the cover 114 is raised and the motor 135 is actuated. Said motor, through the reduction gear 134 and the gears 132 and 131, rotates the sprocket wheels 119 in such a way that the pivots 118 are brought to the position corresponding to the top dead center.

With further respect to the rotation of the wheels 119, the crank gear constituted by the levers 117 and by the beam 115 first raises the cover 114, maintaining it parallel to itself, and then causes it to rotate about the pivots 116 to an angle slightly greater than 90°. These movements are guided by means of the rollers 124 and 125 which slide in the guides 128, 129 and 130.

Simultaneously with the lifting of the cover 114, compressed fluid is progressively injected through the opening 104 of the cylinder 103, in order that the stem 102 may impart a small rotation to the lever 100 by means of the block 101 in contact with the same. This small rotation causes a reduced lifting of the cylinder 84 and consequently a small detachment of the intermediate section 107 of the mold from the upper section 112 and from the lower section 106, avoiding in this way a harmful rubbing between the upper section 112 of the mold and the intermediate section 107.

When the vulcanizing unit is completely open, the plate 105 is raised to its maximum open position by injecting compressed fluid in the cylinders 95 and 96, which cause a further rotation of the lever 100 and the detachment of the block 101 from the stem 102 with a consequent axial upward displacement of the cylinder 84.

The raising of the plate 105 initiates the outward radial motion of the sectors 107 of the mold and therefore their mutual detachment.

The partially shaped tire 142 is then placed on the plate 91 in contact with the lower section 106 of the mold, truing up the lower bead of said tire on the corresponding profile of the edge of said plate 91, and the sprocket wheels 119 are actuated by means of the motor 135 in order to rotate the cover 114 to an angle slightly exceeding 90° and to a point where its edge is horizontal, and to lower it until the inner edge of the upper section 112 of the mold engages the upper bead of the tire 142. The motor 135 is then stopped and compressed fluid is injected through the opening 141, provided in the cylinder 140, in order to push the inner bag 144 downward housed into said cylinder and to insert it progressively inside the tire 142, starting from its clamped edge 143.

The curing bag 144, having a toroidal shape corresponding to the shape of the final inner profile of the tire 142, fits perfectly with the inner surface of the latter without any occurrence of folds. The motor 135 is now actuated in order to rotate the sprocket wheels 119 until the pivots 118 have reached the lower position, represented in FIG. 7, corresponding to the bottom dead center. As a result of this rotation the lower surface of the plate 113 moves downwardly and then contacts the upper surface of the supports 108 of the sectors 107, whereas the upper bead of the tire is brought to its definitive distance with respect to the other bead and the tire makes complete contact both with the lower section 106 of the mold and with the upper section 112. Then the plate 113, during its lowering, pushes the plate 105 downwardly together with the elements supported by it with a pressure higher than that exerted by the fluid under the pistons of the cylinders 95 and 96 which control the axial displacement of the cylinder 84, so that the fluid is caused to return in the feeding pipe. The lowering motion of the plate 105 causes the plates 109 to slide along the fixed plates 110, thus originating the radial approach of the sectors 107 which, by means of their projections, penetrate the surface of the tread of the pneumatic tire 142 and completely enclose the mold, the compressed fluid having been previously released from the cylinder 103. At this moment also the cover 114 comes in contact with the upper edge of the container 82, isolating the mold from the outer room, and the block 101 comes in contact with the stem 102. The tire is then vulcanized in the conventional way by injecting additional compressed fluid in the curing bag 144 through the opening 141, so as to increase its inner pressure, and injecting compressed steam inside the container 82 through the opening 83.

After vulcanization, the pressure inside the container 82 is reduced and the compressed fluid contained in the curing bag 144 is released in order to create such a difference of pressure on the opposite faces of the curing bag that the bag is caused to automatically reenter housing 140.

The vulcanizing unit is then opened again, as described above and the condensate formed in the cylinder 140 is automatically released through the opening 141, the cover 114 being rotated to an angle exceeding 90° with respect to the horizontal plane. Finally, the vulcanized tire is removed from the lower section 106 of the mold by injecting compressed fluid through the opening 85 of the cylinder 84 and consequently by raising the piston 86 which pushes the plate 91 upwardly, supported by the stem 89.

In order to bring again the plate 91 in contact with the lower section 106 of the mold, before treating a new tire, the compressed fluid is released from the cylinder 84 through the opening 85 and compressed fluid is injected over the piston 86 through the opening 87, the tube 88 and the opening 90.

To replace the curing bag 144 with another one, the endless screw 136 is rotated in order to axially displace the cylinder 140 and to release the thickened edge 142 of the curing bag 144.

The apparatus of FIGS. 7 and 8 offers the following advantages with respect to the embodiment as shown by FIG. 5:

(a) Elimination of the mechanical means both for the introduction and, in particular, for the removal of the flexible curing bag from the hollow article. In this way, besides obtaining a considerable simplification of the apparatus, it is possible to provide it with mechanical means to automatically detach and raise the treated article from the lower section of the mold.

(b) Elimination of all the above described inconveniences due to the formation of folds in the curing bag during its introduction in the hollow article. In fact, the adoption of a curing bag of toroidal shape, whose profile corresponds to the final inner profile of the article to be treated, failitates the insertion of the curing bag in said article and its uniform distribution inside the latter.

(c) Disposition of the curing bag into a cylindrical housing situated in the upper part of the machine. Consequently the condensate formed on the face of the curing bag opposite to that which comes in contact with the compressed fluid, is not collected in said curing bag, but drops on the lower section of the mold, still hot for the heat treatment to which the preceding article has been subjected, and then evaporates, departing from the same.

(d) Adoption of an auxiliary means for determining small radial displacements of the sectors which constitute the intermediate section of the mold on its reopening, so that harmful rubbings between the surfaces in mutual contact of the upper section of the mold and of said sectors can be avoided. These rubbings, in fact, can originate considerable scorings, in particular in the most general case in which the material constituting said sectors has a hardness very different from that of the material constituting the two continuous annular sections of the mold.

Figure 9:
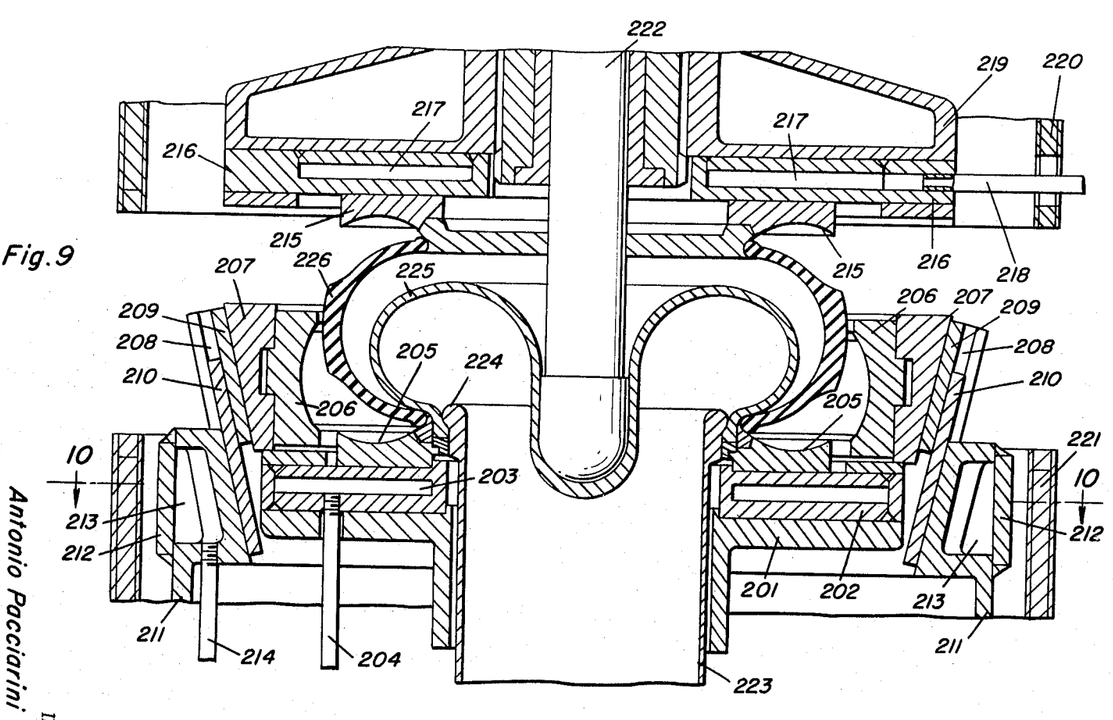
FIG. 9 is a fragmentary detailed section of a curing unit having a curing bag and provided with a further form of apparatus.
Figure 10:
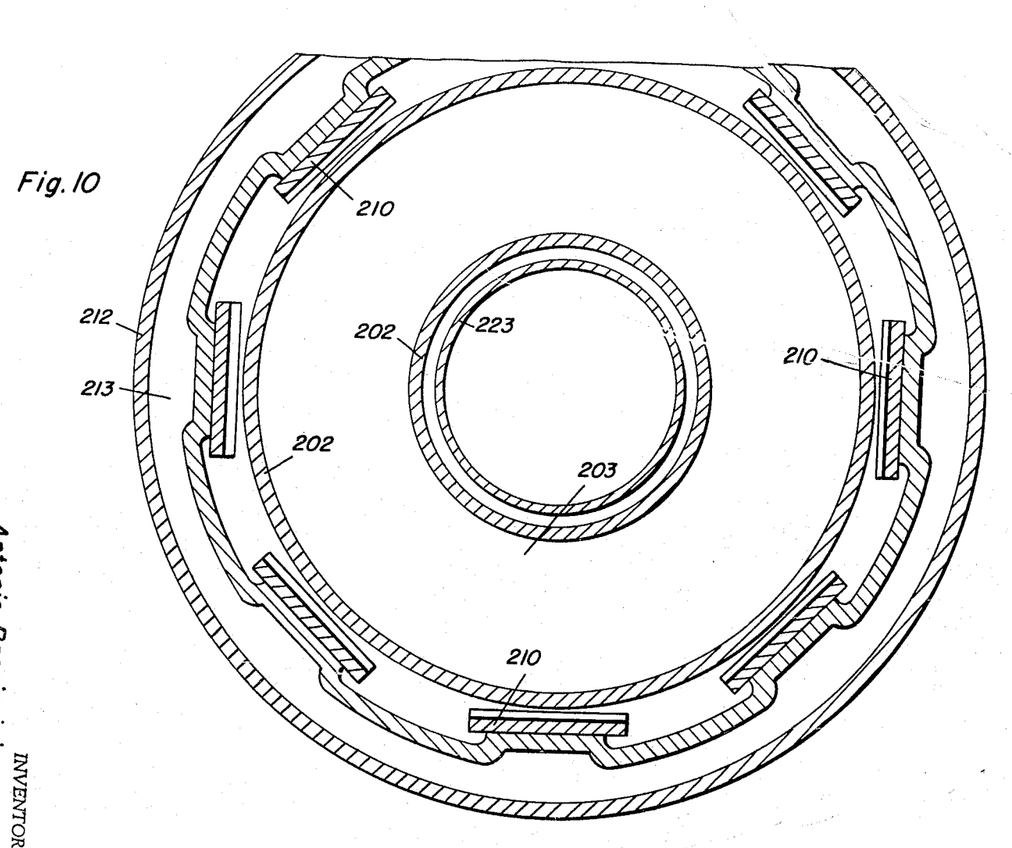
FIG. 10 is a section of FIG. 9, taken along plane 10—10.
Figure 11:
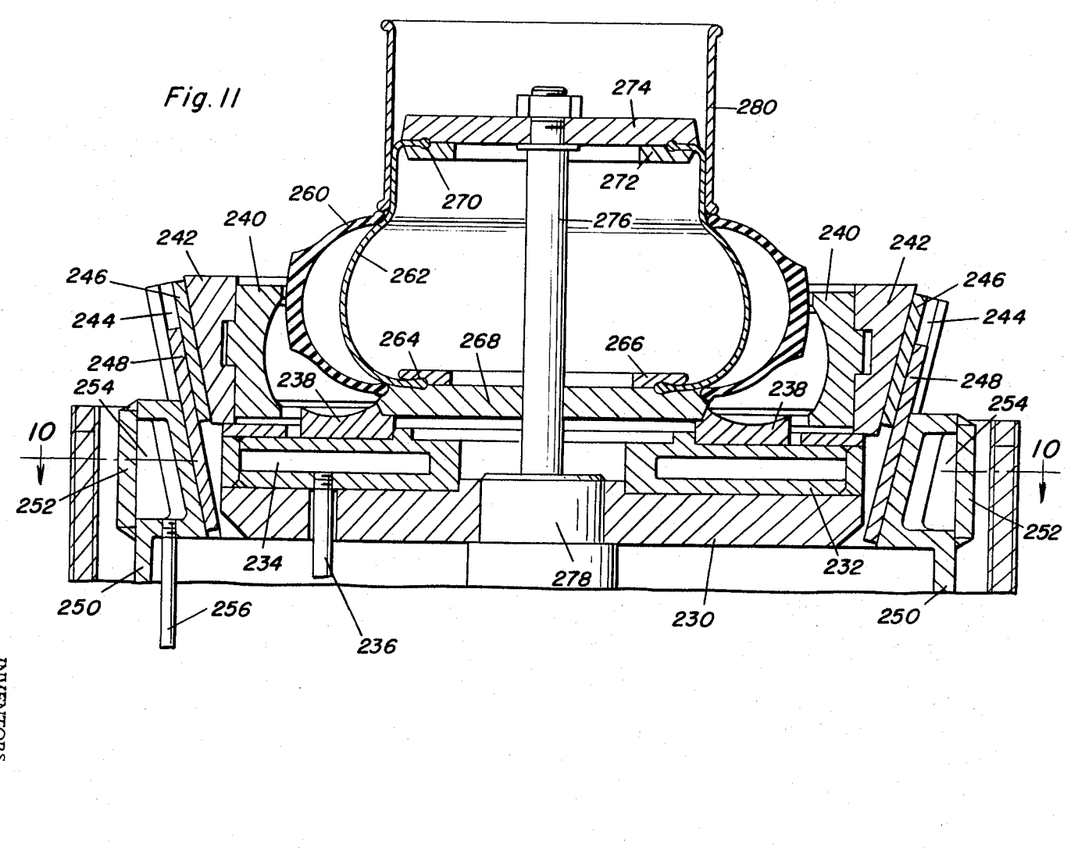
FIG. 11 is a fragmentary detailed section of still another curing unit having a curing bag.

The apparatus shown in FIGS. 9–11 is similar to the apparatus shown in FIGS. 5 and 6, but some details have been modified to make it particularly suitable for differentiated heat treatment of the article, on the peripheral band of which the desired embossed pattern has been printed.

The apparatus shown in FIGS. 9 and 10 comprises a circular plate 201, which supports a second plate 202 provided with a cavity 203. A duct 204 passes through the walls of the plates 201 and 202 and serves for the injection and the discharge of a heated fluid in the cavity 203.

The plate 202 carries the lower section 205 and the central section 206 of a mold. The lower section 205 has a continuous annular shape, whereas the central section 206 is subdivided into a plurality of sectors provided on their inner surface with projections corresponding to the recesses to be produced in the band when molded.

The sectors 206 are assembled on supports 207, each of which is provided with lateral guides 208 and with an inclined plane 209, disposed between the guides 208. In contact with the inclined plane 209 and inserted between each pair of guides 208, there is a second inclined plane 210, integral with the frame 211 of the curing unit by means of the supporting ring 212, provided with an annular cavity 213. A duct 214 passes through the wall of ring 212 and serves for the injection and the discharge of heated compressed fluid inside the cavity 213.

The upper section 215 of the mold is supported by a plate 216, provided with a cavity 217. A duct 218 passes through the wall of the plate 216 and serves for the injection and the discharge of heated compressed fluid inside the cavity 217. The plate 216 is integral with a plate 219 assembled inside the lid 220 of insulating container 221. In the central part of the plates 216 and 219 there is slidably assembled a stem 222, having a lower end portion of hemispherical shape. The stem 222 is actuated by a piston, not shown.

In the central part of the circular plates 201 and 202 there is assembled a cylinder 223 extending downwardly, which is provided at its lower end with an opening for the introduction of curing fluid. Between the lower section 205 of the mold and the cylinder 223 there is clamped the thickened edge 224 of a flexible curing bag 225. The plate 201 and the elements supported by it may be elevated by a piston not shown.

In order to mold the tread band of a tire 226, which is at least partially shaped, and to cure said tire, the plate 201 is initially raised to bring it to the position shown in FIG. 9 in order that the sectors 206 of the mold may be detached from the lower section 205 of the mold. Then the tire 226 is disposed on the lower section 205 of the mold and the plate 219 and the lid 220 are lowered until the section 215 of the mold reaches the upper bead of the tire 226. Then the stem 222 is pushed downwardly and compressed fluid is injected through the opening provided on the bottom of the cylinder 223. Accordingly, the compressed fluid pushes upwardly the curing bag 225, contained in the cylinder 223, and causes the central part of said curing bag to engage with the lower end of the stem 222. This is then progressively withdrawn towards the top, so that the curing bag 225 may gradually mate with the inner surface of the tire 226, starting from its clamped edge. At this stage the upper section 215 of the mold is lowered again. When the lower surface of the plate 216 comes into contact with the upper surface of the sectors 206 and of their supports 207, the tire beads are at their mutual final distance and the tire is in contact with the inner surface of the sections 205 and 215 of the mold. The plate 216, in its further downward movement, pushes the plate 201 and the elements supported by it downwardly under a pressure higher than that exerted by the fluid existing below the piston, which had raised the plate 201, so that said fluid is compelled to return to its feeding pipe. The lowering of the plate 201 causes the sliding of the inclined planes 209 along the stationary inclined planes 210, thus causing the radial approaching of the sectors 206, the projections of which completely penetrate the tread band, and the complete closure of the mold. At this moment also the lid 220 comes into contact with the upper edge of the container 221, isolating the mold from the outer room. Then the curing of the tire is carried out, by injecting additional compressed fluid in the curing bag 225 in order to increase the pressure in its inside and by injecting compressed steam in a continuous way in the caivities 203, 213 and 217, through the ducts 204, 214 and 218, respectively. Steam at different temperatures, preestablished in accordance with the thickness of the single parts of the tire and with the type of compound constituting them, may be injected in the cavities 203, 213 and 217. After curing, the tire 226 is removed from the mold by repeating the above described operations in an inverted sequence, and the curing bag 225 is removed from the inside of the tire 226 by pushing it inside the cylinder 223 by means of the stem 222.

The embodiment shown in FIG. 11 is similar to that illustrated in FIGS. 9 and 10, but substantially differs from that of FIG. 9 as regards the curing bag 262. This curing bag has a tubular shape, and one of its thickened edges 264 is clamped between a ring 266 and a plate 268 integral with the lower section 238 of the mold. The other thickened edge 270 of the curing bag 262 is also clamped between a ring 272 and a circular plate 274 integral with the upper end of a stem 276 slidably assembled inside a hollow stem 278, the upper end of which is integral with the plate 230. The stems 276 and 278 are actuated by two pistons not shown.

Plate 230 supports a second plate 232 provided with a cavity 234. A duct 236 passes through the walls of plates 230 and 232 and serves for the injection and discharge of a heated fluid in cavity 234.

The sectors 240 are assembled on supports 242, each of which is provided by lateral guides 244 and with an inclined plane 246 disposed between the guides 244. In contact with the inclined plane 246, and also extending between guide 244, is a second inclined plane 248, integral with frame 250 by means of the supporting ring 252 provided with an annular cavity 254. A duct 256 passes through the wall of the ring 252 and serves for the injection and discharge of heated compressed fluid inside cavity 254.

FIG. 11 illustrates moreover a cylindrical container 280 which is in the indicated position only during the insertion of the curing bag in the tire 260.

To mold the tread band of the tire 260, which is at least partially shaped, the plate 230 is brought to the preestablished upper position shown in FIG. 11 in order that the central sectors 240 of the mold may be spaced from the lower section 238, and the plate 274 is elevated until the curing bag 262 assumes a cylindrical shape. The tire 260 is telescopically inserted about the bag 262 and its lower bead is caused to engage with the lower section 238 of the mold. Then the cylindrical container 280 is also telescopically inserted about the bag 262 and is lowered until its lower edge engages with the upper bead of the tire 260. The plate 274 is progressively lowered and at the same time, through an opening not shown, compressed fluid is injected inside the bag 262 which, sliding along the inner surface of the container 280, gradually penetrates inside the tire 260 and mates with its inner surface. When the curing bag 262 is completely penetrated inside the tire 260, the container 280 is removed and the lid of the curing unit, not shown, is lowered.

While the lid of the curing unit lowers, the upper half mold, which is fast with it, engages on the upper bead of the tire and pushes it downwardly until it has reached the final distance from the other bead. At this stage additional compressed fluid is injected inside the curing bag 262 to oppose the pressure which is exerted immediately afterwards on the tread band by the sectors 240 due to the sliding of the inclined planes 246 along the inclined planes 248 because of the lowering of the plate 230, pushed downwardly by the upper part of the curing unit. When the mold is completely closed, additional compressed fluid is injected inside the curing bag 262 to increase the pressure inside it and the curing operation is carried out by injecting heating fluids in cavities 234 and 254.

For the removal of the cured tire from the mold, the above indicated operations are repeated in an inverted sequence. In this second phase, however, the presence of the container 280 is not necessary.

It is understood that the constructional details of the devices which control the radial displacement of the central sectors of the mold and of those which control the introduction or the removal of the tire curing bag may be varied without prejudicing the spirit and the scope of the present invention.

Likewise, also when the article to be molded is hollow and impermeable, the presence of an inflatable core is not necessary, since the fluid may be injected in direct contact with the inner surface of the article.

Apparatus as in FIGS. 9–11 offers the advantage that it is possible to graduate at will the intensity of the heat treatment of the various parts of the article, on the tread band of which the pattern has been previously printed.

Since the entire article is to be subjected to a heat treatment lasting for an equal period of time, in order to vary the intensity of the heat treatment, resort is to be had to a differentiation of the temperatures of the fluid injected into the cavities 234 and 254 provided in proximity of the mold sections. For instance in a pneumatic tire, in which the composition of the compound constituting the tread band and the thickness of the latter are different from those of the sidewalls, it may be sometimes advantageous to inject a fluid at a higher temperature in the cavities nearest to the sectors which constitute the central section of the mold rather than in the cavities adjacent to the continuous sections of the mold.

What is claimed is:

1. Apparatus for imprinting a predetermined embossed pattern upon the peripheral band of a toroidal article while the band is in a plastic state, comprising a mold having two coaxial continuous annular sections and a third section disposed between said coaxial continuous annular sections, said third section including a plurality of sectors, each sector having on its inner surface a plurality of radial projections adapted to engage said peripheral band; means to axially displace at least one of said coaxial continuous annular sections relative to the other; and means to displace said sectors in a radially inward direction towards said article after said article has been enclosed between said coaxial continuous annular sections to contact said coaxial continuous annular sections so that said projections produce cavities in said band in accordance with the embossed pattern.

2. Apparatus as defined by claim 1, wherein said means to displace said sectors is adapted to displace said sectors in an outwardly radial direction away from said article after the imprinting of said pattern.

3. Apparatus as defined by claim 1, wherein said means for displacing the sectors in a radial direction comprise a support member for each sector, one face of each of said support members being fixed to a corresponding sector and the opposite face being provided with an inclined plane; a second inclined plane fixed with respect to said sectors and slidably engaging said first inclined plane; and means for controlling the relative sliding movement between said two inclined planes.

4. Apparatus as defined by claim 3, further comprising a plurality of guide members engaging said inclined planes to limit lateral movement thereof.

5. Apparatus as defined by claim 3, further comprising a circular plate carrying one of said coaxial continuous annular sections, and adapted to carry said third section; and wherein said means for controlling the relative sliding movement between said two inclined planes are adapted to control the movement of said plate coaxially with the mold sections to cause the radial displacement of said sectors.

6. Apparatus as defined by claim 5, wherein said sectors are adapted to move out of contact with said coaxial continuous annular sections in response to a portion of said movement of said plate.

7. Apparatus as defined by claim 1, cmprising means to apply an outwardly directed pressure from the inside of the toroidal article to oppose the pressure exerted by the sectors on the peripheral band of the article during their inwardly radial displacement.

8. Apparatus as defined by claim 7, wherein said means to apply said outwardly directed pressure includes means to inject into, and thereafter to discharge from, the toroidal article, a fluid at a pressure greater than the pressure exerted by the sectors on said peripheral band, said injection being before the inwardly radial displacement of the sectors.

9. Apparatus as defined by claim 7, wherein said means to apply said outwardly directed pressure comprises a flexible bag disposed inside the article, and means to inject inside and thereafter to discharge from said bag, a fluid at a pressure greater than the pressure exerted by the sectors on said peripheral band.

10. Apparatus as defined by claim 9, comprising means for introducing said bag inside said article after the latter has been positioned on one of said coaxial continuous annular sections.

11. Apparatus as defined by claim 10, wherein said means for introducing said bag inside said article comprises a first ring carried by one of the annular sections, a piston slidable in a direction normal to said coaxial continuous annular sections, a disc disposed on the stem of said piston, and a second ring carried by said disc, said bag being cylindrical and clamped at one edge between said one of said coaxial continuous annular sections and said first ring, and at the other edge between said disc and said second ring, said stem passing through a central hole of said one of the coaxial continuous annular sections.

12. Apparatus as defined by claim 11, further comprising a fluid-tight member adapted to enclose said mold, and means for injecting heated and compressed fluid inside said fluid-tight member and for adjusting the pressure of said fluid.

13. Apparatus as defined by claim 10, further comprising a cylindrical container disposed in a central opening formed in one of said coaxial continuous annular sections, said bag being clamped by its circular edge to said one of said coaxial continuous annular sections and being encased into said cotnainer, said means to inject said compressed fluid beig adapted to inject the fluid between the inner surface of the container and said bag.

14. Apparatus as defined by claim 13, further comprising a stem slidable into a central opening in the other of said coaxial continuous annular sections, said stem having a semi-spherical end adapted to engage with the central portion of said bag; and means for moving said stem axially in both directions.

15. Apparatus as defined by claim 14, further comprising a fluid-tight member adapted to enclose said mold, and means for injecting heated and compressed fluid inside said fluid-tight member and for adjusting the pressure of said fluid.

16. Apparatus as defined by claim 13, wherein the axis of the coaxial continuous annular sections is vertical, said bag is fastened to the upper annular section, and said cylindrical container is disposed with its opening directed downwardly; and further comprising a circular plate for supporting the lower continuous annular section and said third section, and a double-acting cylinder integral with said plate and extending from a central hole of the latter axially with respect to the lower continuous annular section, said means for radially displacing said sectors being adapted to displace said double-acting cylinder coaxially with respect to said lower continuous annular section.

17. Apparatus as defined by claim 16, wherein said double-acting cylinder comprises a piston slidable therein and a stem connected at one end with said piston, and further comprising a second plate supported by the opposite end of said stem, said second plate extending parallel to said first plate, having a smaller diameter, and shaped as to be able to reecive an edge of the toroidal article.

18. Apparatus as defined by claim 16, further comprising means for axially displacing said cylindrical container.

19. Apparatus as defined by claim 18, further comprising a fluid-tight member adapted to enclose said mold, and means for injecting heated and compressed fluid inside said fluid-tight member and for adjusting the pressure of said fluid.

References Cited
UNITED STATES PATENTS

| | | | |
|---|---|---|---|
| 1,260,990 | 3/1918 | Doughty | 18—17 |
| 1,388,255 | 8/1921 | Hardeman | 18—17 |
| 1,475,032 | 11/1923 | Shrum et al. | |
| 1,577,886 | 3/1926 | Willshaw | 264—313 |
| 2,567,985 | 9/1951 | Baker et al. | 18—18 |
| 2,728,105 | 12/1955 | Pacciarini | 18—17 |
| 2,730,763 | 1/1956 | Brundage | 18—17 |
| 2,747,225 | 5/1956 | Zona | 18—17 |
| 2,854,693 | 10/1958 | Robbins | 18—17 X |
| 2,880,458 | 4/1959 | Frohlich et al. | 18—17 X |
| 2,987,769 | 6/1961 | Frohlich | 18—17 X |
| 3,057,011 | 10/1962 | Knox | 18—42 |
| 3,065,499 | 11/1962 | Brundage et al. | 18—2 |
| 3,082,480 | 3/1963 | Balle | 18—42 |
| 3,097,394 | 7/1963 | Mallory et al. | 18—17 |

FOREIGN PATENTS

| | | |
|---|---|---|
| 619,870 | 7/1962 | Belgium. |
| 1,328,194 | 4/1963 | France. |
| 177,006 | 3/1922 | Great Britain. |
| 491,474 | 9/1938 | Great Britian. |
| 279,107 | 1/1963 | Spain. |
| 285,220 | 5/1963 | Spain. |

J. SPENCER OVERHOLSER, *Primary Examiner.*

J. HOWARD FLINT, JR., *Examiner.*

UNITED STATES PATENT OFFICE
CERTIFICATE OF CORRECTION

Patent No. 3,337,918                             August 29, 1967

Antonio Pacciarini et al.

It is hereby certified that error appears in the above numbered patent requiring correction and that the said Letters Patent should read as corrected below.

In the heading to the printed specification, line 10, after "665,377" insert -- ; Aug. 4, 1964, application 17022/64 --; column 6, line 55, for "permits" read -- permits, --; column 10, line 44, for "failitates" read -- facilitates --; column 11, line 75, for "caivities" read -- cavities --; column 14, line 43, for "cotnainer" read -- container --; line 44, for "beig" read -- being --.

Signed and sealed this 19th day of November 1968.

(SEAL)
Attest:

Edward M. Fletcher, Jr.                            EDWARD J. BRENNER
Attesting Officer                                     Commissioner of Patents